United States Patent [19] [11] Patent Number: 4,553,182
Narita [45] Date of Patent: Nov. 12, 1985

[54] DEVICE FOR DETECTING ABNORMALITIES IN TAPE TRAVEL

[75] Inventor: Shuichi Narita, Yamato, Japan

[73] Assignee: Victor Company of Japan, Ltd., Japan

[21] Appl. No.: 535,852

[22] Filed: Sep. 26, 1983

[30] Foreign Application Priority Data

Sep. 28, 1982 [JP] Japan ................................. 57-169237

[51] Int. Cl.$^4$ ........................ G11B 15/00; G11B 15/54
[52] U.S. Cl. ..................................... 360/96.1; 360/69;
360/74.2; 360/85; 360/137; 242/191
[58] Field of Search ........................ 360/69, 74.1, 74.2,
360/74.6, 137, 73, 71, 72.3, 85, 96.1, 72.2;
242/186, 191, 206, 75.51, 208–210, 203, 75.52;
318/6, 7

[56] References Cited

U.S. PATENT DOCUMENTS

| 3,805,286 | 4/1974 | Kavanagh et al. | 360/73 |
| 3,834,648 | 9/1974 | Rose, Jr. et al. | 242/186 |
| 3,849,661 | 11/1974 | Beiter | 242/75.52 |
| 3,879,756 | 4/1975 | De Bell et al. | 318/6 |
| 3,921,220 | 11/1975 | Primosch et al. | 242/191 |
| 4,015,799 | 4/1977 | Koski et al. | 242/203 |
| 4,163,532 | 8/1979 | Sakai | 242/186 |
| 4,210,785 | 7/1980 | Huber et al. | 360/72.2 |
| 4,213,583 | 7/1980 | Mitani et al. | 242/186 |
| 4,225,890 | 9/1980 | Takenaka et al. | 360/71 |
| 4,333,115 | 6/1982 | Junio | 360/74.2 |
| 4,341,364 | 7/1982 | Maddaloni | 242/191 |
| 4,389,684 | 6/1983 | Aihara | 360/71 |

FOREIGN PATENT DOCUMENTS

| 2648396 | 11/1980 | Fed. Rep. of Germany | 318/7 |
| 2401485 | 3/1979 | France . | |
| 58-125253 | 7/1983 | Japan | 360/137 |
| 1376125 | 12/1974 | United Kingdom . | |
| 2044981 | 10/1980 | United Kingdom | 242/191 |

OTHER PUBLICATIONS

Patents Abstracts of Japan, vol. 6, No. 252(P-161) (1130), Dec. 10, 1982; & JP-A-57 147 150.
Electronic Engineering, vol. 51, No. 629, Oct. 1979, pp. 127–133, London (GB).
Patents Abstracts of Japan, vol. 5, No. 165 (P-85) (837), Oct. 22, 1981; & JP-A-56 94 534.
Patents Abstracts of Japan, vol. 5, No. 122 (P-74) (794), Aug. 7, 1981; & JP-A-56 61 059.

Primary Examiner—Raymond F. Cardillo, Jr.
Assistant Examiner—Steven R. Garland
Attorney, Agent, or Firm—Andrus, Sceales, Starke & Sawall

[57] ABSTRACT

A detecting device for detecting abnormality in the tape travel, comprises detectors for detecting capstan rotation pulses which have a frequency in accordance with the rotational speed of a capstan which drives and causes a tape to travel, supply reel rotation pulses which have a frequency in accordance with the rotational speed of a supply reel which pays out the tape, and take-up reel rotation pulses which have a frequency in accordance with the rotational speed of a take-up reel which takes up the tape, and a detecting circuit supplied with the three kinds of rotation pulses, for detecting abnormality in the tape travel and for producing an abnormality detection signal which indicates that an abnormality has been detected in the tape travel. The abnormality detecting circuit comprises a microcomputer for carrying out steps of counting the received capstan rotation detection pulses until a counted value of the capstan rotation pulses reaches a predetermined counted value, discriminating whether a supply reel rotation pulse was received during the counting period of the capstan rotation pulses, discriminating whether a take-up reel rotation pulse was received during this counting period, discriminating whether a capstan rotation pulse was received within a predetermined time period, and generating the abnormality detection signal when any one of the three discriminated results is "NO".

5 Claims, 17 Drawing Figures

DEVICE FOR DETECTING ABNORMALITIES IN TAPE TRAVEL

BACKGROUND OF THE INVENTION

The present invention generally relates to detecting devices for detecting abnormalities in tape travel, and more particularly to a device for positively detecting abnormalities such as stoppage of magnetic tape travel which is caused by mechanical and electrical abnormalities in a traveling path of a magnetic tape, abnormalities in a driving system for the magnetic tape, and the like within a magnetic recording and/or reproducing apparatus.

Generally, in a magnetic recording and/or reproducing apparatus which employs a magnetic tape, a mechanical abnormality may occur when the apparatus is in a tape travel mode in which the tape travels. Such a mechanical abnormality may occur when dew is formed on a member which makes contact with the tape and the tape sticks to this member, or when the tape runs off a normal tape path due to some cause and the tape is caught by a member such as a gear, for example. When such a mechanical abnormality occurs, the tape stops traveling. In addition, an electrical abnormality may also occur in the tape travel mode of the apparatus. Such an electrical abnormality may occur when a motor itself such as a capstan motor and a reel motor breaks down, or a motor driving circuit fails, for example. When such an electrical abnormality occurs, the tape travel also stops. It is necessary to detect the abnormality in the tape travel when the mechanical or electrical abnormality occurs, so as to change the mode of the recording and/or reproducing apparatus to a stop mode by a detection signal and prevent the magnetic tape, the motor, and the like from becoming damaged.

As a device for detecting such abnormality in the tape travel, there was a conventional detecting device comprising means for detecting rotations of a take-up reel and a supply reel, two counters, and three NAND circuits. In this conventional detecting device, rotation pulses having a repetition frequency which is in accordance with the rotational speed of the take-up reel and are detected by the means for detecting the rotation of the take-up reel, are supplied to a clock terminal of the first counter and a reset terminal of the second counter. Rotation pulses having a repetition frequency which is in accordance with the rotational speed of the supply reel and are detected by the means for detecting the rotation of the supply reel, are supplied to a clock terminal of the second counter and a reset terminal of the first counter. The first counter counts the take-up reel rotation pulses and is reset by the supply reel rotation pulse. The counted value in the first counter is supplied to the first NAND circuit. The second counter counts the supply reel rotation pulses, and is reset by the take-up reel rotation pulse. The counted value in the second counter is supplied to the second NAND circuit. Outputs of the first and second NAND circuits are supplied to the third NAND circuit, and an abnormality detection signal is produced from the third NAND circuit.

When the recording and/or reproducing apparatus is in the tape travel mode such as a recording mode, normal reproduction mode, slow-motion reproduction mode, and quick-motion reproduction mode and the magnetic tape is traveling in a normal manner, the take-up reel rotation pulse and the supply reel rotation pulse are supplied to the reset terminals of the first and second counters to reset the first and second counters. Thus, the counted values in the first and second counters are within a range of "0" and "14", and do not exceed fourteen. As a result, at least one bit among the four bits which represents the counted value constantly assumes low level, in both the first and second counters. Accordingly, when the magnetic tape is traveling in a normal manner, the output levels of the first and second NAND circuits are both high. Hence, the output level of the third NAND circuit which receives these high-level outputs of the first and second NAND circuits, is low. This low-level output of the third NAND circuit is obtained through an output terminal.

On the other hand, when a mechanical or electrical abnormality occurs and interferes with the tape travel, one of the take-up reel rotation pulse and the supply reel rotation pulse ceases. As a result, the first or the second counter assumes a counted value "15", and the output level of the first or second NAND circuit becomes low. Thus, the output level of the third NAND circuit becomes high, and this high-level output is produced through the output terminal as an abnormality detection signal which indicates that an abnormality was detected in the tape travel.

The conventional detecting device described heretofore detected the abnormality in the tape travel, according to the existence of the take-up reel rotation pulse and the supply reel rotation pulse. Thus, there was a disadvantage in that it was impossible to detect abnormality in the tape travel when the two reels are still rotating even after the capstan motor has stopped and the tape has stopped traveling. Further, a ratio $N_T/N_S$ between the rotational speed $N_T$ of the take-up reel and the rotational speed $N_S$ of the supply reel undergoes a large change within a range of 0.3 and 27, for example, according to the diameters of rolls remaining on the reels. However, in order to detect the abnormality in the tape travel although the ratio $N_T/N_S$ undergoes a change in such a wide range, it was necessary to reserve sufficient margin for the detecting value. Therefore, there was a disadvantage in that it took a long time to detect that an abnormality has occurred from a time when the abnormality had actually occurred.

SUMMARY OF THE INVENTION

Accordingly, it is a general object of the present invention to provide a novel and useful detecting device for detecting abnormality in the tape travel, in which the above described disadvantages have been overcome.

Another and more specific object of the present invention is to provide a detecting device for detecting abnormality in the tape travel, in which the rotation of a capstan is detected together with the rotation of a supply reel and a take-up reel, and a capstan rotation pulse is taken as a reference to detect the existence of a supply reel rotation pulse and a take-up reel rotation pulse and to detect the existence of a capstan rotation pulse within a predetermined period. According to the detecting device of the present invention, the abnormality in the tape travel can be detected within a short period of time, and the accuracy with which the abnormality is detected is substantially constant regardless of the speed of the tape travel.

Still another object of the present invention is to provide a detection device for detecting abnormality in the tape travel, which is designed to count a predetermined number of capstan rotation pulses having a repetition frequency which is in accordance with the rotational speed of the capstan obtained by detecting the rotation of the capstan, discriminate whether a supply reel rotation pulse which is obtained by detecting the rotation of the supply reel and a take-up reel rotation pulse which is obtained by detecting the rotation of the take-up reel existed within a counting period in which the predetermined number of the capstan rotation pulses were counted, discriminates whether the capstan rotation pulse existed within a preestablished constant period, and generate an abnormality detection signal when neither the supply reel rotation pulse nor the take-up reel rotation pulse existed within the counting period or when the capstan rotation pulse did not exist within the pre-established constant period.

According to the detecting device of the present invention, the constant detecting period is provided, and the abnormality in the tape travel is detected when no capstan rotation pulse existed within that constant detecting period. Thus, it is possible to detect the abnormality in the tape travel even when the capstan motor is locked. In addition, the rotation of the capstan is compared with the rotations of the supply reel and the take-up reel. Hence, the margin which must be reserved for the detecting value may be set to a small value compared to the margin which had to be reserved in the conventional device which detected the abnormality in the tape travel, solely from the relation between the rotations of the supply reel and the take-up reel. As a result, according to the present invention, the abnormality can be detected within a shorter period of time from the time when the abnormality actually occurred. Further, because the repetition frequency of the capstan rotation pulses changes according to the speed of the tape travel, the counting period in which a predetermined number of capstan rotation pulses are counted changes according to the tape traveling speed, and the abnormality in the tape travel can be detected from the ratios of the rotational speed of the capstan with respect to the rotational speeds of the supply reel and the take-up reel. Therefore, the present invention is advantageous in that the accuracy with which the abnormality in the tape travel is detected, can be maintained substantially constant regardless of the tape traveling speed.

Other objects and further features of the present invention will be apparent from the following detailed description when read in conjunction with the accompanying drawings.

DETAILED DESCRIPTION

Figure 1:
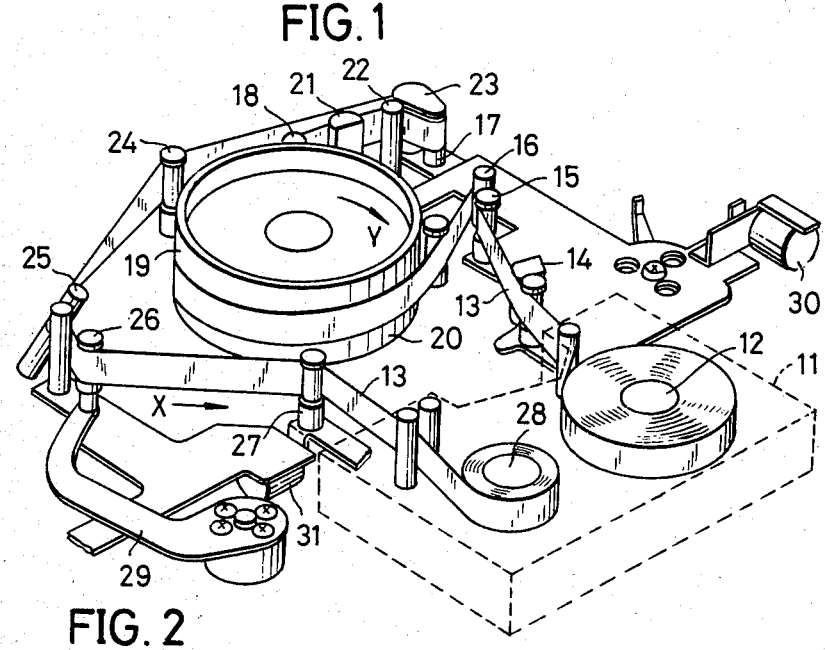
FIG. 1 a perspective view showing an example of a recording and/or reproducing apparatus which may be applied with a detecting device according to the present invention.

First, general description will be given with respect to an example of a recording and/or reproducing apparatus which may be applied with the detecting device according to the present invention, by referring to FIGS. 1 and 2. FIG. 1 shows the recording and/or reproducing apparatus in a state where a magnetic tape 13 is drawn out from a tape cassette 11 indicated by a dotted line, and loaded unto a predetermined tape path. The tape 13 which is paid out from a supply reel 12 within the tape cassette 11, makes contact with an erasing head 14, a guide pole 15, and a supply tension pole 16. The tape 13 is then wrapped around peripheral surfaces of a rotary drum 19 and a stationary drum 20, to make contact with the peripheral surfaces of the drums 19 and 20 throughout an angular range which is slightly larger than 180°. This angular range is determined by guide poles 17 and 18. The tape 13 further makes contact with audio and control head 21 and passes between a capstan 22 and a pinch roller 23. The tape path changes at the pinch roller 23, and the tape 13 makes contact with return poles 24 and 25, a loading pole 26, and a take-up tension pole 27, to be finally taken up by a take-up reel 28.

When forming the predetermined tape path described above, the tape 13 which is accommodated within the tape cassette 11 is drawn out of the tape cassette 11 by the loading pole 26 which is provided at the tip end of a loading arm 29. Then, a ring (not shown) which surrounds the drums 19 and 20 is rotated. A guide pole which is provided on this ring moves the tape 13 as the ring rotates, to form the predetermined tape path.

A pair of mutually opposing video heads (not shown) are fixed to the bottom surface of the rotary drum 19. The rotary drum 19 is rotated by a head motor, and rotates in the direction of an arrow Y in synchronism with the video heads. In addition, during a normal recording mode or a normal reproducing mode, the pinch roller 23 is pressed against the capstan 22 with the tape 13 pinched therebetween, and the tape 13 is accordingly moved in the direction of an arrow X to be taken up by the take-up reel 28.

A core of a differential transformer 30 is displaced according to the rotation of the supply tension pole 16, and a core of a differential transformer 31 is displaced according to the rotation of the take-up tension pole 27. These differential transformers 30 and 31 are provided for detecting the tape tension introduced by the tension poles 16 and 27.

Figure 2:
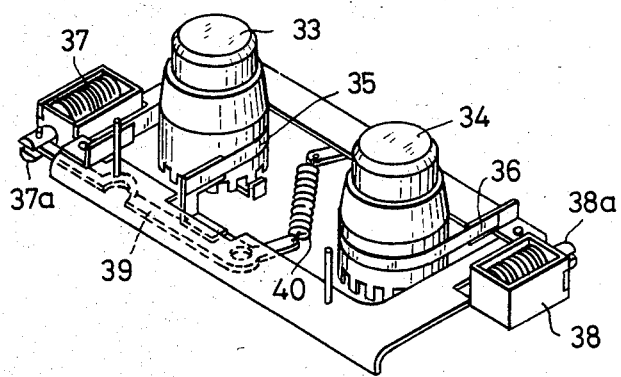
FIG. 2 is a perspective view showing a reel disc device part of the apparatus shown in FIG. 1.

In FIG. 2, a take-up reel disc 33 and a supply reel disc 34 are respectively rotated by a reel motor, and the take-up reel disc 33 rotates the take-up reel 28. The supply reel disc 34 rotates the supply reel 12. Brake bands 35 and 36 are respectively wrapped around the reel discs 33 and 34, and both ends of the brake band 35 are fixed to an arm 39. One end of the arm 39 is fixed to a plunger rod 37a which is drawn inwards when a solenoid 37 is energized, and the other end of the arm 39 is fixed to a spring 40. Similarly, both ends of the brake band 36 are fixed to another arm. One end of this other arm is fixed to a plunger rod 38a which is drawn inwards when a solenoid 38 is energized, and the other end of this other arm is fixed to the spring 40.

A gear wheel part 41 with equi-distant gear pitch, is formed at the lower part of the reel disc 33. An optical path reaching a light receiving element of a detector 42 which comprises a photo coupler, from a light emitting element of the detector 42, is intermittently blocked by the gear wheel part 41 which rotates unitarily with the reel disc 33. As a result, take-up reel rotation pulses having a repetition frequency (a frequency of 9 Hz to 29 Hz during the normal reproduction, for example) which is in accordance with the rotational speed of the take-up reel disc 33 and the take-up reel 28, are obtained from the light receiving element of the detector 42. Similarly, a known rotation detecting mechanism comprising a gear wheel part 43 and a detector 45 (FIG. 3) which comprises a photo coupler, is provided with respect to the supply reel disc 34. Supply reel rotation pulses having a repetition frequency which is in accordance with the rotational speed of the supply reel disc 34 and the supply reel 12, are obtained from a light receiving element of this detector 45 which is provided with respect to the supply reel disc 34. Although not shown in FIGS. 1 and 2, the rotation of a capstan motor 46 shown in FIG. 3 which rotates the capstan 22, can be similarly detected by a known detector 47 such as a photo coupler, a frequency generator, and the like, and capstan rotation pulses having a repetition frequency (a frequency of 30 Hz during the normal reproduction, for example) which is in accordance with the rotational speed of the capstan 22, can be obtained from this detector 47.

Figure 3:
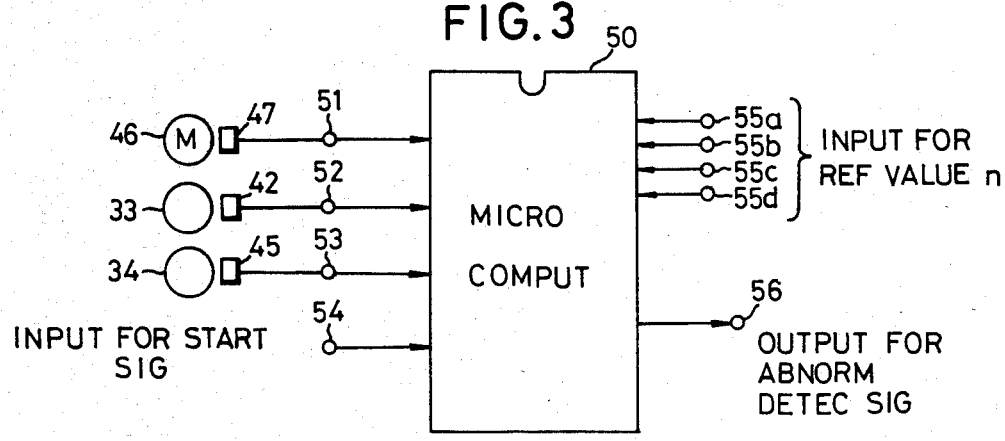
FIG. 3 shows input and output terminals of a microcomputer which is used in a detecting device according to the present invention, together with rotation detecting means.

Next, description will be given with respect to a microcomputer which is used in an embodiment of a detecting device according to the present invention which can be applied to the recording and/or reproducing apparatus described heretofore, by referring to FIG. 3. In a microcomputer 50, the capstan rotation pulses are supplied to an input terminal 51, the take-up reel rotation pulses are supplied to an input terminal 52, and the supply reel rotation pulses are supplied to an input terminal 53. A tape travel mode signal which becomes a start signal for starting a program, is applied to an input terminal 54. A reference value n which is compared with the counted value of the capstan rotation pulses, is loaded through 4-bit input terminals 55a through 55d. The reference value n is to be determined from ratios of the capstan rotation pulses with respect to the reel rotation pulses. If the ratios of the capstan rotation pulses with respect to the reel rotation pulses are in a range of 1.1 to 3.2, a sufficient margin is reserved and the reference value n is selected to "10", for example. An abnormality detection signal which indicates that an abnormality has occurred in the tape travel, is obtained through an output terminal 56.

Figure 4:
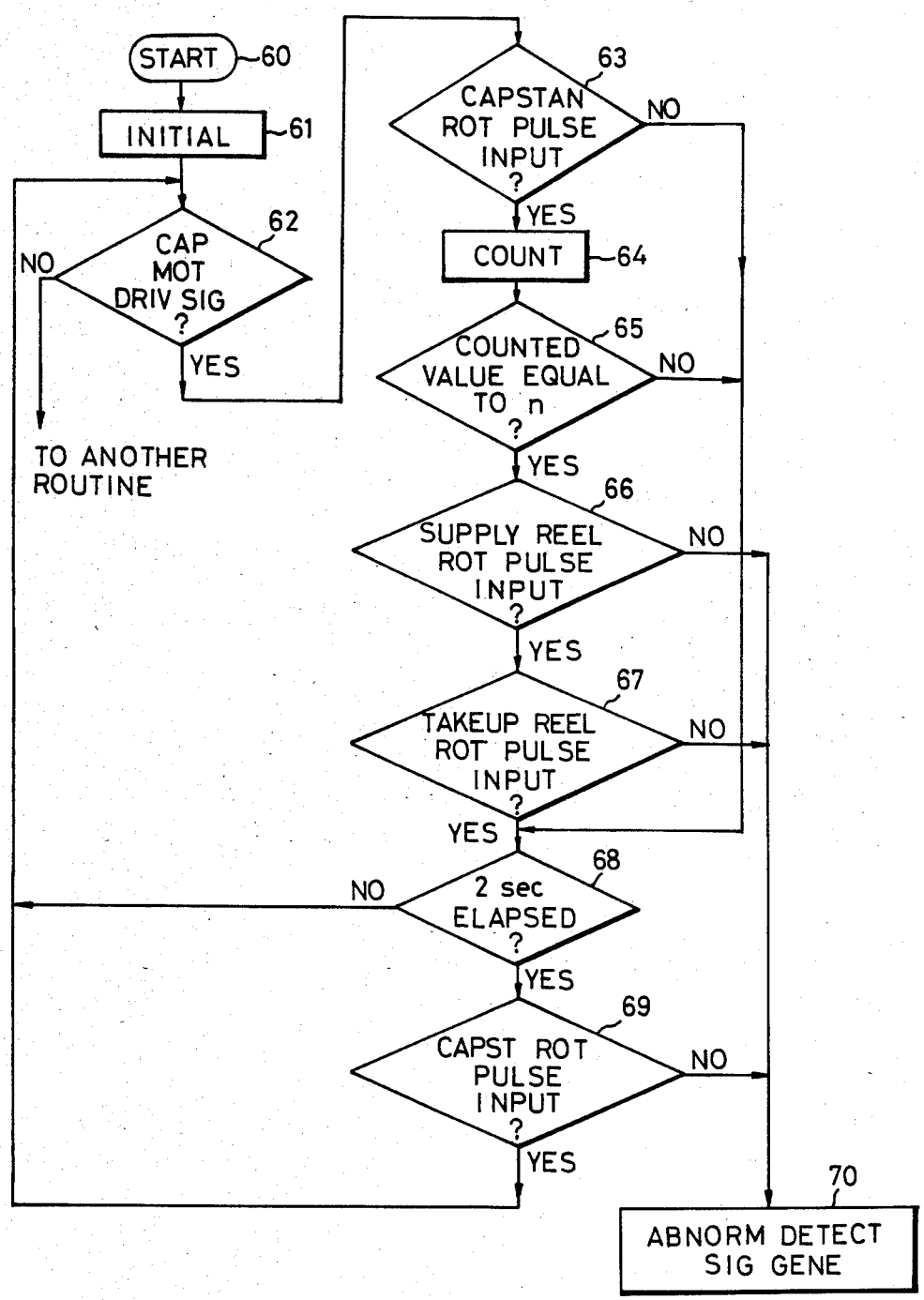
FIG. 4 is a flowchart for explaining the operation of the microcomputer shown in FIG. 3.

A microcomputer LM6416E manufactured by Tokyo Sanyo Electric Co., Ltd., may be used for the microcomputer 50. The microcomputer 50 carries out processing operations which will be described in conjunction with the flowchart shown in FIG. 4. The processing operation of the microcomputer 50 starts at a step 60 when the start signal is applied to the input terminal 54 of the microcomputer 50. A subsequent step 61 carries out initial settings. Then, a step 62 discriminates whether a capstan motor driving signal exists. If the discrimination result in the step 62 is "NO", the microcomputer 50 carries out another routine which is not directly related to the subject matter of the present invention. This other routine is not illustrated in FIG. 4 because there is no direct relation with respect to the subject matter of the present invention. On the other hand, if the discrimination result in the step 62 is "YES", a step 63 is carried out to discriminate whether a capstan rotation pulse was applied to the input terminal 51. If the discrimination result in the step 63 is "NO", a step 68 which will be described hereinafter is subsequently carried out. If the discrimination result in the step 63 is "YES", a step 64 is carried out to count the capstan rotation pulses.

Next, a step 65 discriminates whether the counted value obtained at the step 64 has become equal to the reference value n which is obtained through the input terminals 55a through 55d. If the discrimination result in the step 65 is "NO", the step 68 is carried out. This step 68 discriminates the lapse of two seconds. The operation is returned to the step 62 until there is lapse of two seconds, and the step 65 continues the discrimination until the counted value in the step 64 becomes equal to the reference value n. When the counted value in the step 64 becomes equal to the reference value n, the discrimination result in the step 65 becomes "YES", and the operation advances to a step 66. The step 66 discriminates whether a supply reel rotation pulse was applied to the input terminal 53 during the counting period in which the capstan rotation pulses are counted in the step 64. The repetition frequency of the capstan rotation pulses supplied to the input terminal 51, is 30 Hz during the normal reproduction, recording, and the like when the tape travels at a normal tape traveling speed. When the supply reel rotation pulse is applied to the input terminal 53 while the microcomputer 50 is counting n capstan rotation pulses in the step 64, the discrimination result in the step 66 is "YES", and a step 67 is subsequently carried out. The step 67 discriminates whether a take-up reel rotation pulse was applied to the input terminal 52 during the counting period of the capstan rotation pulses.

When neither the take-up reel rotation pulse nor the supply reel rotation pulse is applied to the respective input terminals 52 and 53 during the counting period in which n capstan rotation pulses are counted, the discrimination results in the steps 66 and 67 are both "NO". Thus, the operation advances to a step 70. This step 70 generates the abnormality detection signal which indicates that an abnormality has occurred in the tape travel, and produces this abnormality detection signal through the output terminal 56.

On the other hand, when the supply reel rotation pulse and the take-up reel rotation pulse are each applied to the respective input terminals 53 and 52 during the counting period of the capstan rotation pulses, the discrimination results in the steps 66 and 67 are both "YES". Thus, the operation successively advances to the step 68 to discriminate the lapse of two seconds. The discrimination result in the step 68 is "NO" until there is a lapse of two seconds. When the discrimination result in the step 68 is "NO", the operation is returned to the step 62, and the steps 62 through 67 are repeated. When there is a lapse of two seconds, the discrimination result in the step 68 becomes "YES", a step 69 is subsequently carried out to discriminate whether the capstan rotation pulse was applied to the input terminal 51 during the two seconds. The discrimination result in the step 69 is "YES" if at least one capstan rotation pulse is applied to the input terminal 51 during the two seconds. When the discrimination result in the step 69 is "YES", the operation then advances to the step 62, and the processing operations described before are again carried out. However, if no capstan rotation pulse is applied to the input terminal 51 during the two seconds, the discrimination result in the step 69 is "NO", the operation advances to the step 70 in which the abnormality detection signal is generated and produced through the output terminal 56.

In the present embodiment, the counting period of the capstan rotation pulses, that is, the detecting period in which the capstan rotation pulses are detected, is set to two seconds because the slowest mode of reproduction in the recording and/or reproducing apparatus in the 1/30-speed slow-motion reproduction mode. The frequency of the capstan rotation pulses during such 1/30-speed slow-motion reproduction mode is 1 Hz, and one capstan rotation pulse is accordingly applied to the input terminal 51 in one second. Thus, a margin is reserved so that at least two capstan rotation pulses are detected, and the detecting period of the capstan rotation pulses is selected to two seconds. The detecting period of the capstan rotation pulses, however, is not limited to two seconds. According to the recording and/or reproducing apparatus to which the detecting device of the present invention is applied, the detecting period may be selected to a time period other than two seconds, by taking into account the slow-motion ratio, the repetition frequency of the capstan rotation pulses, and the like.

Next, description will be given with respect to the operation of the microcomputer 50 under conditions in which abnormalities exist in the tape travel, in conjunction with the waveforms of the pulses. When there is a mechanical abnormality in the tape travel, the tape stops traveling even when the recording and/or reproducing apparatus is in the tape travel mode. This mechanical abnormality occurs when the magnetic tape 13 sticks to a part of the tape traveling path due to the formation of frost, and when the magnetic tape 13 greatly runs off the normal tape traveling path and becomes caught in a mechanical part such as a gear, for example. The tape also stops traveling when there is an electrical abnormality in the tape travel, even if the recording and/or reproducing apparatus is in the tape travel mode. This electrical abnormality occurs when the motor driving circuit or the motor (capstan and reel motors) itself breaks down, and when abnormal tension is introduced in the tape and the tape cannot be taken up, for example. When the tape stops traveling, this tape stoppage is accompanied by at least one of three phenomenons. The three phenomenons are: (1) the supply reel 12 does not rotate; (2) the take-up reel 28 does not rotate; and (3) the capstan 22 does not rotate. Accordingly, the abnormality in the tape travel can be detected by detecting these phenomenons.

Figure 5:
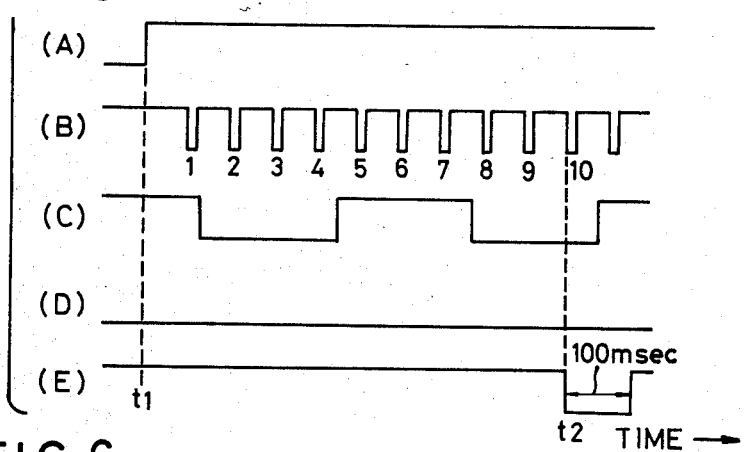
FIGS. 5(A) through 5(E), FIGS. 6(A) through 6(E), and FIGS. 7(A) through 7(C) are graphs showing signal waveforms of input and output signals of the microcomputer shown in FIG. 3.

First, description will be given with respect to the operation to detect the abnormality in the tape travel, for the case where the supply reel 12 does not rotate. When the start signal is applied to the input terminal 54 at a time t1 to put the recording and/or reproducing apparatus in the tape travel mode, and the capstan motor driving signal assumes high level at the time t1 as shown in FIG. 5(A), the microcomputer 50 starts to detect the abnormality in the tape travel. The capstan rotation pulses shown in FIG. 5(B) are supplied to the input terminal 51, and the take-up reel rotation pulses shown in FIG. 5(C) are supplied to the input terminal 52. In this case, because the supply reel 12 does not rotate, no supply reel rotation pulse is supplied to the input terminal 53. Thus, the signal level at the input terminal 53 remains constant as shown in FIG. 5(D). As described previously in conjunction with the flowchart shown in FIG. 4, the microcomputer 50 discriminates that no supply reel rotation pulse was supplied to the input terminal 53 at a time t2 when n (n=10 in the present embodiment) capstan rotation pulses shown in FIG. 5(B) have been counted. Therefore, the microcomputer 50 generates an abnormality detection signal shown in FIG. 5(E) in which the pulse width is 100 msec, for example, and this abnormality detection signal is produced through the output terminal 56.

Figure 6:
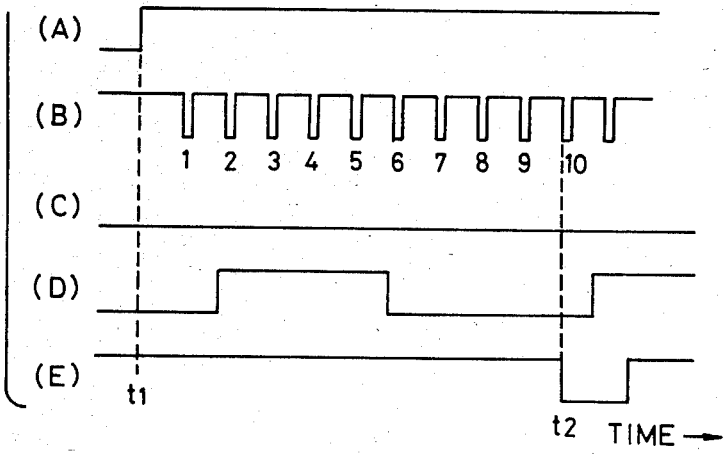

Description will now be given with respect to the operation to detect the abnormality in the tape travel when the take-up reel 28 does not rotate. The capstan motor driving signal assumes high level at the time t1 as shown in FIG. 6(A). Thus, the capstan rotation pulses shown in FIG. 6(B) are supplied to the input terminal 51, and the supply reel rotation pulses shown in FIG. 6(D) are supplied to the input terminal 53. However, no take-up reel rotation pulse is supplied to the input terminal 52 because the take-up reel 28 does not rotate. The signal level at the input terminal 52 remains constant as shown in FIG. 6(C). Accordingly, the microcomputer 50 discriminates that no take-up reel rotation pulse was supplied to the input terminal 52 at the time t2 when 10 capstan rotation pulses shown in FIG. 6(B) have been counted. Therefore the microcomputer 50 generates an abnormality detection signal shown in FIG. 6(E), and produces this abnormality detection signal through the output terminal 56.

Figure 7:
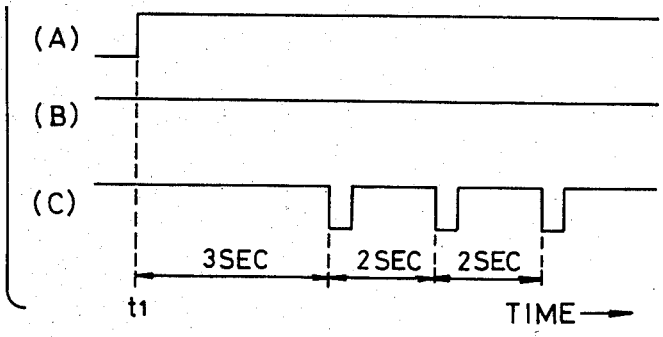

Next, description will be given with respect to the operation to detect the abnormality in the tape travel when the capstan 22 does not rotate. It is assumed that the capstan motor and the capstan 22 do not rotate, although the high-level driving signal shown in FIG. 7(A) has been supplied to the capstan motor from the time t1. In this case, no capstan rotation pulse is supplied to the input terminal 51, and the signal level at the input terminal 51 remains constant as shown in FIG. 7(B). Accordingly, the microcomputer 50 carries out the processing operations in steps 63, 68, 69, and 70 shown in FIG. 4 after an arbitrary time of one second elapses from the time t1. This arbitrary time of one second is initially set. The microcomputer 50 generates an abnormality detection signal shown in FIG. 7(C). First, the abnormality detection signal is generated after three seconds, and thereafter, the abnormality detection signal is generated for every two seconds, as shown in FIG. 7(C). The generated abnormality detection signal is produced through the output terminal 56.

According to the present embodiment, the existence of the capstan rotation pulse is detected for every two seconds, so as to detect the existence of an abnormality in the tape travel. In addition, the existence of the take-up reel rotation pulse and the supply reel rotation pulse within the counting period of the capstan rotation pulses, is detected so as to detect the existence of an abnormality in the tape travel.

Further, the present invention is not limited to these embodiment, but various variations and modifications may be made without departing from the scope of the present invention.

What is claimed is:

1. A detecting device for detecting abnormality in the tape travel, said detecting device comprising:
first detecting means for detecting capstan rotation pulses which have a frequency in accordance with the rotational speed of a capstan which drives and causes a tape to travel;
second detecting means for detecting supply reel rotation pulses which have a frequency in accordance with the rotational speed of a supply reel which pays out the tape;

third detecting means for detecting take-up reel rotation pulses which have a frequency in accordance with the rotational speed of a take-up reel which takes up the tape; and abnormality detecting means supplied with said capstan rotation pulses, said supply reel rotation pulses, and said take-up reel rotation pulses, for detecting abnormality in the tape travel and for producing an abnormality detection signal which indicates that an abnormality has been detected in the tape travel, said abnormality detecting means comprising a microcomputer for carrying out a processing operation which includes steps of counting the received capstan rotation detection pulses until a counted value of the capstan rotation pulses reaches a predetermined counted value, discriminating whether a supply reel rotation pulse was received during a period in which said capstan rotation pulses are counted until the predetermined counted value is reached, discriminating whether a take-up reel rotation pulse was received during a period in which said capstan rotation pulses are counted until the predetermined counted value is reached, discriminating whether a capstan rotation pulse was received within a predetermined time period, and generating said abnormality detection signal when any one of the three discriminated results is "NO".

2. A detecting device as claimed in claim 1 in which the step of counting said capstan rotation pulses until the predetermined counted value is reached in said microcomputer, includes steps of counting the received capstan rotation pulses, and discriminating whether a counted value obtained in the step of counting the received capstan rotation pulses has reached a predetermined reference value.

3. A detecting device as claimed in claim 1 in which said microcomputer further includes a step of discriminating whether said predetermined time period has elapsed, and returning to an initial step and repeating each step when a discriminated result is "NO" and advancing to the step of discriminating whether the capstan rotation pulse was received within said predetermined time period when the discriminated result is "YES".

4. A detecting device as claimed in claim 3 in which said predetermined time period is selected to approximately two seconds.

5. A detecting device for detecting abnormality in the tape travel, said detecting device comprising:

first detecting means for detecting capstan rotation pulses which have a frequency in accordance with the rotational speed of a capstan which drives and causes a tape to travel;

second detecting means for detecting supply reel rotation pulses which have a frequency in accordance with the rotational speed of a supply reel which pays out the tape;

third detecting means for detecting take-up reel rotation pulses which have a frequency in accordance with the rotational speed of a take-up reel which takes up the tape; and abnormality detecting means supplied with said capstan rotation pulses, said supply reel rotation pulses, and said take-up reel rotation pulses, for detecting abnormality in the tape travel and for producing an abnormality detection signal which indicates that an abnormality has been detected in the tape travel, said abnormality detecting means comprising a microcomputer for carrying out a processing operation which includes a first step of counting the received capstan rotation detection pulses, a second step of discriminating whether a counted value of said capstan rotation pulses has reached a predetermined reference value, a third step of discriminating whether a supply reel rotation pulse was received during a period in which said capstan rotation pulses are counted until the predetermined reference value is reached, a fourth step of discriminating whether a take-up reel rotation pulse was received during a period in which said capstan rotation pulses are counted until the predetermined reference value is reached, a fifth step of discriminating whether a predetermined time period has elapsed and returning to an initial step to repeat each step when a discriminated result of this fifth step is "NO", the processing operation advancing to said fifth step when a discriminated result in said second step is "NO", a sixth step of discriminating whether a capstan rotation pulse was received within said predetermined time period, and a seventh step of generating said abnormality detection signal when any one of the three discriminated results in said third, fourth, and sixth steps is "NO".

* * * * *